Oct. 28, 1941.  W. F. JOHNSON  2,260,908
UPHOLSTERY RETAINER
Filed Oct. 7, 1940
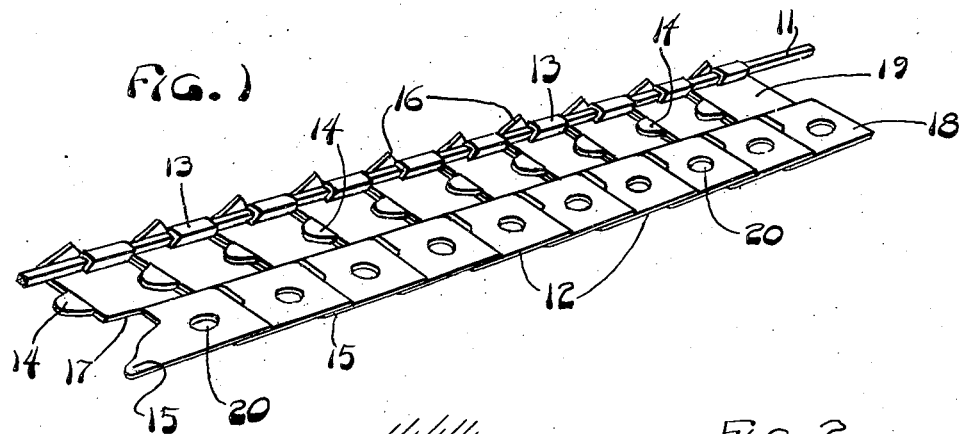
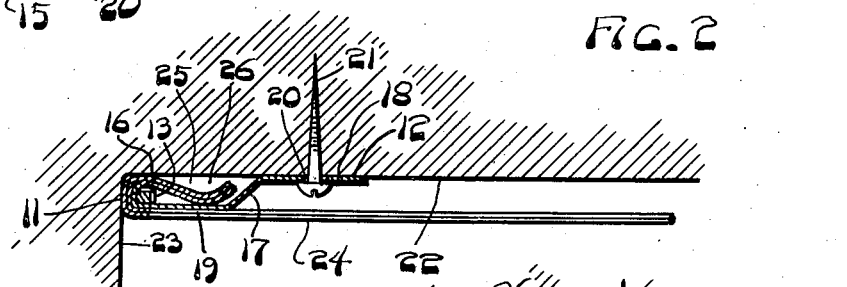
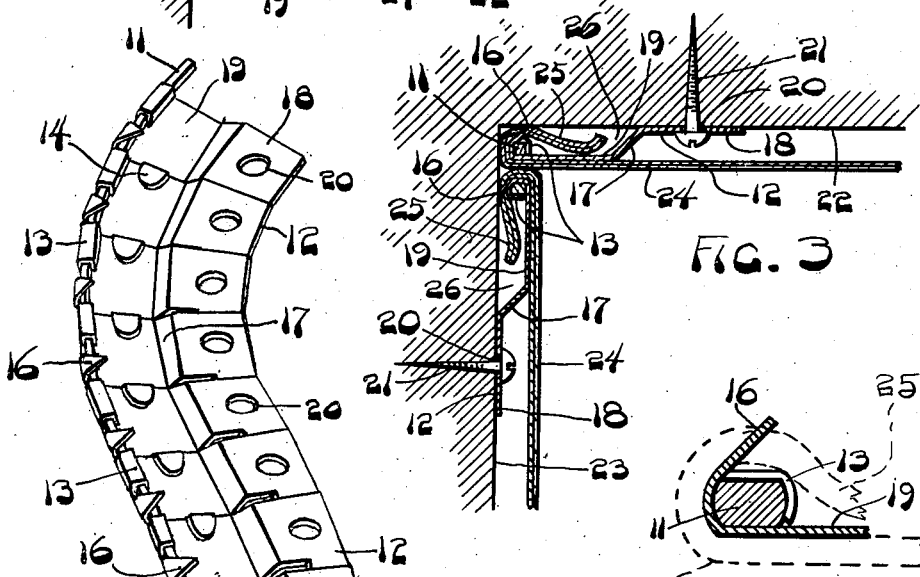
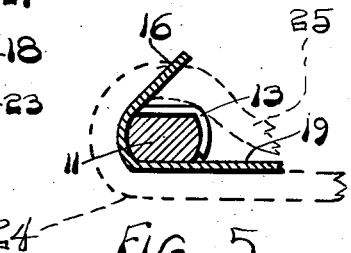
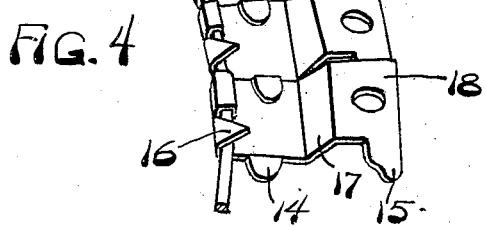
INVENTOR.
BY Walter F. Johnson
Bogert & Bogert
ATTORNEYS Patented Oct. 28, 1941

2,260,908

UNITED STATES PATENT OFFICE 2,260,908

UPHOLSTERY RETAINER

Walter F. Johnson, Cincinnati, Ohio

Application October 7, 1940, Serial No. 360,129

6 Claims. (Cl. 45—138)

In the mounting of upholstery material on surfaces, such as the interiors of automobiles and similar structures, wherein a fabric such as mohair, tapestry, and the like is employed as the covering, various expedients have been employed, extending through the usual and well known means of the character of adhesives, tacks, hooks, snap fasteners, preformed hooked strips, and the like.

These agencies each have objections of sufficient magnitude to justify their rejection from consideration as applied to certain usages. Particularly is this true of the automobile, wherein ceiling and wall surfaces are so non-planar in shape as to require material variability of edge conformation, wide variation of mounting spots or points of placement and attachment, and a variety of agencies or means by which the mounting is accomplished in view of the character of material of which the surface which is to receive the upholstery is made.

An object of this invention is to produce an upholstery retainer which will be universal as to its applicability to surfaces to receive the upholstery, both as to the shape of such surfaces and the material of which they are made, as well as the number and available points, spots, locations and areas of portions thereof which may be available for fastening or retaining purposes.

Another object is to produce such a retainer as does not require preshaping or forming in dies or jigs of a costly character, which does not require previous treatment or edge binding of the upholstery material, which does not necessitate previous and accurate placement of the retainer parts on the upholstery material before it is placed in position, which does not injure the texture of the upholstery and mar its surface when in place, which requires no edge-concealing binding, molding, or other devices to render the results of its operation sightly and pleasing, which is permanently mounted before it receives the upholstery which it supports, and which becomes completely concealed the moment its function of mounting the upholstery material has been performed.

A further object is to produce a retainer for upholstery, in which no especially designed tool is employed in the mounting operation, in which especially trained and skilled operatives are not required to perform the operation, and in which pleasing conformation to and concealment of harsh structural details of the surfaces, as in an automobile body, in a simple, quick, inexpensive and effective manner.

These and other objects are attained in the retainer I am about to describe, and which is illustrated in the accompanying drawing, in which:

Fig. 1 is a perspective view of a strip of the upholstery retainer I have devised.

Fig. 2 is a sectional view of a typical and exemplary manner of mounting and using the retainer shown in Fig. 1.

Fig. 3 is a view similar to Fig. 2, but showing one way in which an additional retainer and its mounted upholstery material may be applied to complete the covering of adjacent ceiling and/or wall surfaces when provision has been made for the upholstery of an adjacent surface.

Fig. 4 is a perspective view of such a strip of upholstery retainer as is shown in Fig. 1, but bent into such a form as would conform to the shape of reverse curvatures of wall edge, as might be encountered in automobile body interiors, for example.

Fig. 5 is a sectional view through one of the sections of which the retainer is formed.

The construction of the retainer I have shown is such that a flexible structure is produced. This is made possible by providing a flexible wire core 11 which may be bent in any direction desired for the curvature or shape of the surface edge to which the retainer is to be fitted. On this core a series of overlapping hooked sections 12 are fitted by having a tubular lug 13 of each gripping the wire and preferably spot welded or otherwise gripping the wire to assist in retaining the sections in place. I have found that a wire of non-round cross section is desirable as core material because it permits of the lugs 13 being shaped to grip the wire, thereby preventing displacement of the lugs rotatively on the wire.

Each of the sections is provided with lugs 14 and 15 which lie on opposite sides of the clear edge of the adjacent cooperating section, so that separation or relative movement of the sections in their planes may be made freely, with angular movements in directions normal to their planes being restricted or limited. However, because of the use of a non-round core 11, even separation of the sections 12 to the degree that the lugs 14 and 15 thereof become disengaged from the next adjacent section, will not result in planar disalignment of the sections, as for example when pronounced curvature adjustment of the retainer becomes necessary in adapting it to a position where it is to be used. Also, on each section, adjacent to the tubular lug 13 thereof, I have provided a prong, barb or hook 16 which, as the several views of the drawing disclose, occupy inclination or angle upwardly or away from the general plane of the section. Additionally, each section is bent between its ends to provide an inclined part 17 which connects the two end portions 18 and 19. These end portions each occupy different elevations or planes, each of which has been provided for a specific purpose. In portion 18 I provide an opening 20 for the reception of a screw or other fastening device by means of which the retainer is secured to the surface to be upholstered, and, through the relative depression of portion 19 relatively to portion 18 and the point of the barb 16, I provide a space which, with the adjacent sections affords a channel in which upholstery material may be tucked in the course of the upholstering operations which I now describe.

Assuming a surface which is to be upholstered or covered with a decorative or protective material of flexible sheet type, such as fabric, leather or other adaptable agency, to be as has been shown at 22 in Fig. 2, with perhaps an adjacent surface 23, the retainer I have devised is placed in position with its barbed edge lying close to the adjacent surface, but spaced therefrom a convenient distance to permit the upholstery material to be tucked around and between the wall and retainer as shown. The retainer is then secured in place by the screws or other fastening agencies as the disclosure suggests. This position brings the barb points substantially against the surface which mounts the retainer. Then, the edge of the upholstery material 24 is placed against the retainer, with a little overlap to provide for tucking it back of and into engagement with the barbs, the surplus 25 being permitted to occupy the channel 26 which the depressed portions 19 create. This tucking or upholstery gripping operation may be performed most easily by means of a simple tool of general blade-like character, the edge of which obviously is not sharp and which may be curved conveniently to facilitate the tucking operation. Thus, by a mere tucking movement of the tool between the material and the surface to be covered, proper stretching adjustment for uniformity of appearances of the upholstery, will be accomplished with a minimum of effort, skill and time, the yielding or spring-like character of the retainer permitting of passage of the material into impingement relationship with the barbs and into the channel.

Having thus described my invention what I claim is:

1. A flexible upholstery retainer adaptable to curvatures to be fitted, consisting of a series of substantially identical lugged sections having hooks thereon, and means uniting the sections flexibly with the lugs thereof interlocked and with the hooks thereof aligned for upholstery impalement and retention thereon.

2. A flexible upholstery retainer consisting of a series of interlocking sections, a flexible substantially flat wire mounting for the sections, upholstery retaining hooks on the sections, and means on the sections adjacent to the hooks to secure the retainer with its hooks placed to engage an upholstery material when tucked into place back of the hooks and upon the surface to receive it.

3. In a retainer adapted to mount and retain upholstery material on a surface to be upholstered, a series of hook-equipped sections mounted rigidly and in sequence on a flexible element, the sections having means whereby the assembly may be fastened at intervals with the hooks adjacent to said surface to receive and retain upholstery material in stretched condition on said surface through impalement on said hooks, the flexible element permitting of retainer conformance with the contour of said surface.

4. An upholstery retainer consisting of a strip-like structure having hooks along one edge adapted to be engaged by and to retain upholstery material upon a mere tucking of said material between the strip and the surface to receive the material, said structure consisting of a series of interlocking sections mounted on a flexible element adapting said sections to relative adjustability, whereby the hooks may be brought to retaining position relatively to the surface to be upholstered, each of said sections having means adapted to fasten them in such retaining positions.

5. An upholstery retainer consisting of a series of hook and lug equipped sections and a flexible section-connecting element mounting the sections in coplanar relationship as a unit, the lugs of each section overlapping each next adjacent section to permit of sliding-guiding adjustment of the sections substantially in the plane of their assembly, the hooks extending substantially out of alignment with the plane of the sections, said sections having means whereby the retainer may be mounted with the hooks directed for impalement of the upholstery material thereon adjacent to the surface to receive it.

6. A flexible upholstery retainer flexibly adapted and fixable relatively to the surface to be upholstered, consisting of a series of substantially identical sections, a flexible element uniting the sections, lugs on the sections placed for overlapping relationship to guide the sections upon movement thereof in adjusting the retainer to the surface to be upholstered, and a hook on each section located for placement in close association with the surface to be upholstered when said sections are adapted thereto, whereby the edge of upholstery material on the surface receiving it may be tucked between the hooks and the surface, thereby becoming impaled on the hooks and retained in relatively stretched condition on the surface.

WALTER F. JOHNSON.